(12) United States Patent
Mehring et al.

(10) Patent No.: US 10,755,230 B2
(45) Date of Patent: Aug. 25, 2020

(54) PROCESS AND CONDITION RECORDING AND VALIDATION USING A BLOCKCHAIN

(71) Applicant: Zest Labs, Inc., San Jose, CA (US)

(72) Inventors: Peter A. Mehring, Los Altos, CA (US); Scott A. Durgin, San Jose, CA (US); Thomas C. Reese, Ellicott City, MD (US)

(73) Assignee: Zest Labs, Inc., San Jose, CA (US)

( * ) Notice: Subject to any disclaimer, the term of this patent is extended or adjusted under 35 U.S.C. 154(b) by 168 days.

(21) Appl. No.: 15/984,047

(22) Filed: May 18, 2018

(65) Prior Publication Data

US 2018/0336515 A1 Nov. 22, 2018

Related U.S. Application Data

(60) Provisional application No. 62/508,932, filed on May 19, 2017.

(51) Int. Cl.
*G06Q 10/08* (2012.01)
*H04L 9/06* (2006.01)
*H04L 9/32* (2006.01)

(52) U.S. Cl.
CPC ......... *G06Q 10/087* (2013.01); *H04L 9/0637* (2013.01); *H04L 9/3239* (2013.01); *H04L 2209/38* (2013.01)

(58) Field of Classification Search
CPC ... G06Q 10/087; H04L 9/3239; H04L 9/0637; H04L 2209/38
See application file for complete search history.

(56) References Cited

U.S. PATENT DOCUMENTS

| | | |
|---|---|---|
| 2009/0157569 A1 | 6/2009 | Henby et al. |
| 2015/0094111 A1 | 4/2015 | Kim et al. |
| 2016/0292634 A1 | 10/2016 | Mehring et al. |
| 2016/0300234 A1 | 10/2016 | Moss-Pultz et al. |
| 2017/0011276 A1 | 1/2017 | Mehring et al. |
| 2017/0046694 A1 | 2/2017 | Chow et al. |

(Continued)

FOREIGN PATENT DOCUMENTS

WO 2017027648 A1 2/2017

OTHER PUBLICATIONS

K. Toyoda, P. T. Mathiopoulos, I. Sasase and T. Ohtsuki, "A Novel Blockchain-Based Product Ownership Management System (POMS) for Anti-Counterfeits in the Post Supply Chain," in IEEE Access, vol. 5, pp. 17465-17477, 2017. (Year: 2017).*

(Continued)

*Primary Examiner* — Ashford S Hayles
(74) *Attorney, Agent, or Firm* — Zilka-Kotab, P.C.

(57) ABSTRACT

A computer-implemented method, according to one embodiment, includes receiving, over a network, one or more sensor-recorded data elements related to information selected from the group consisting of: product identification, condition associated with a consumer product at a particular time and/or place, location associated with the consumer product at the particular time and/or place, and current state associated with a consumer product at a particular time and/or place. The received data elements are used to create or update an entry for the payload of a transaction in a blockchain. The entry is sent for recording as a transaction in a specified blockchain ledger.

26 Claims, 5 Drawing Sheets

(56) References Cited

U.S. PATENT DOCUMENTS

| | | | |
|---|---|---|---|
| 2017/0230189 A1* | 8/2017 | Toll | G06F 21/6272 |
| 2017/0262862 A1* | 9/2017 | Aljawhari | G06F 16/90335 |
| 2018/0130050 A1* | 5/2018 | Taylor | H04L 9/3247 |
| 2018/0174094 A1* | 6/2018 | Ren | G06Q 10/087 |
| 2018/0189528 A1* | 7/2018 | Hanis | G06Q 30/0185 |
| 2019/0114584 A1* | 4/2019 | Toohey | G06K 19/07758 |

OTHER PUBLICATIONS

Wang H, Peng J, Xie C, Bao Y, He Y. Fruit quality evaluation using spectroscopy technology: a review. Sensors (Basel). 2015;15(5):11889-11927. Published May 21, 2015. doi:10.3390/s150511889 (Year: 2015).*

Matiacevich S, Celis Cofré D, Silva P, Enrione J, Osorio F. Quality Parameters of Six Cultivars of Blueberry Using Computer Vision. Int J Food Sci. 2013;2013:419535. doi:10.1155/2013/419535 (Year: 2013).*

Monzo C, Stansly PA. Economic injury levels for Asian citrus psyllid control in process oranges from mature trees with high incidence of huanglongbing. PLoS One. 2017;12(4):e0175333. Published Apr. 20, 2017. doi:10.1371/journal.pone.0175333 (Year: 2017).*

Wikipedia, "Blockchain," Wikipedia, updated Aug. 15, 2018, 16 pages, retrieved from https://en.wikipedia.org/wiki/Blockchain.

International Search Report and Written Opinion from PCT Application No. PCT/US 18/33541, dated Aug. 13, 2018.

Mehring et al. U.S. Appl. No. 15/085,288, filed Mar. 30, 2016.

Mehring et al. U.S. Appl. No. 15/205,296, filed Jul. 8, 2016.

International Preliminary Examination Report from PCT Application No. PCT/US2018/033541, dated Mar. 19, 2020.

* cited by examiner

PROCESS AND CONDITION RECORDING AND VALIDATION USING A BLOCKCHAIN

PRIORITY

This application claims priority to U.S. Provisional Patent Application No. 62/508,932, which is herein incorporated by reference.

FIELD OF THE INVENTION

The present invention relates to process and condition monitoring, and more particularly, this invention relates to recording and validation of the results of such monitoring using a blockchain.

BACKGROUND

The process of delivering products has become more complex as it has become increasingly time sensitive in many situations. This is particularly apparent for the delivery of perishable food products and/or prepared meals that may have an effective lifetime of mere days, to no more than a few hours. Moreover, supply chains are being strained to meet shorter delivery times caused by the short effective lifetime of many products. It follows that, for companies shipping products that are sensitive to time, temperature, humidity, etc., or otherwise considered perishable products, there is a challenge in ensuring the products are managed properly, arrive in a desirable condition and within a defined delivery time. Furthermore, for companies receiving products that are sensitive to time, temperature, humidity, etc., or other perishable products, there is a need for ensuring the products being received have been handled properly, are in desirable condition and are within defined delivery times. Often the impact of mishandling is not visually apparent, and therefore invisible to the receiver without product condition monitoring throughout distribution.

However, even with product condition monitoring, the participants in a supply chain may be unable to utilize product data collected during the shipping process until after the product has been delivered. Therefore, those shipping products may not realize that a shipment of perishable products has surpassed a product tolerance until after it has been delivered, e.g., after receipt, upon their inspection. Moreover, because the product may have changed hands several times before reaching its destination, the ultimate recipient does not know which participant in the supply chain mishandled the product, or to what effect.

What is needed is not only a way to acquire data on conditions of or around a product as it moves through commerce, but also a way to acquire data on whether processes of handling the product were complied with. What is further needed is a way to ensure that the data collected is both readily available and as tamper-proof as possible.

SUMMARY

A computer-implemented method, according to one embodiment, includes receiving, over a network, one or more sensor-recorded data elements related to information selected from the group consisting of: product identification, condition associated with a consumer product at a particular time and/or place, location associated with the consumer product at the particular time and/or place, and current state associated with a consumer product at a particular time and/or place. The received data elements are used to create or update an entry for the payload of a transaction in a blockchain. The entry is sent for recording as a transaction in a specified blockchain ledger.

A computer program product according to one embodiment includes a computer readable storage medium having instructions stored thereon, which when executed by a computer, cause the computer to perform the foregoing method.

DETAILED DESCRIPTION

Figure 1:
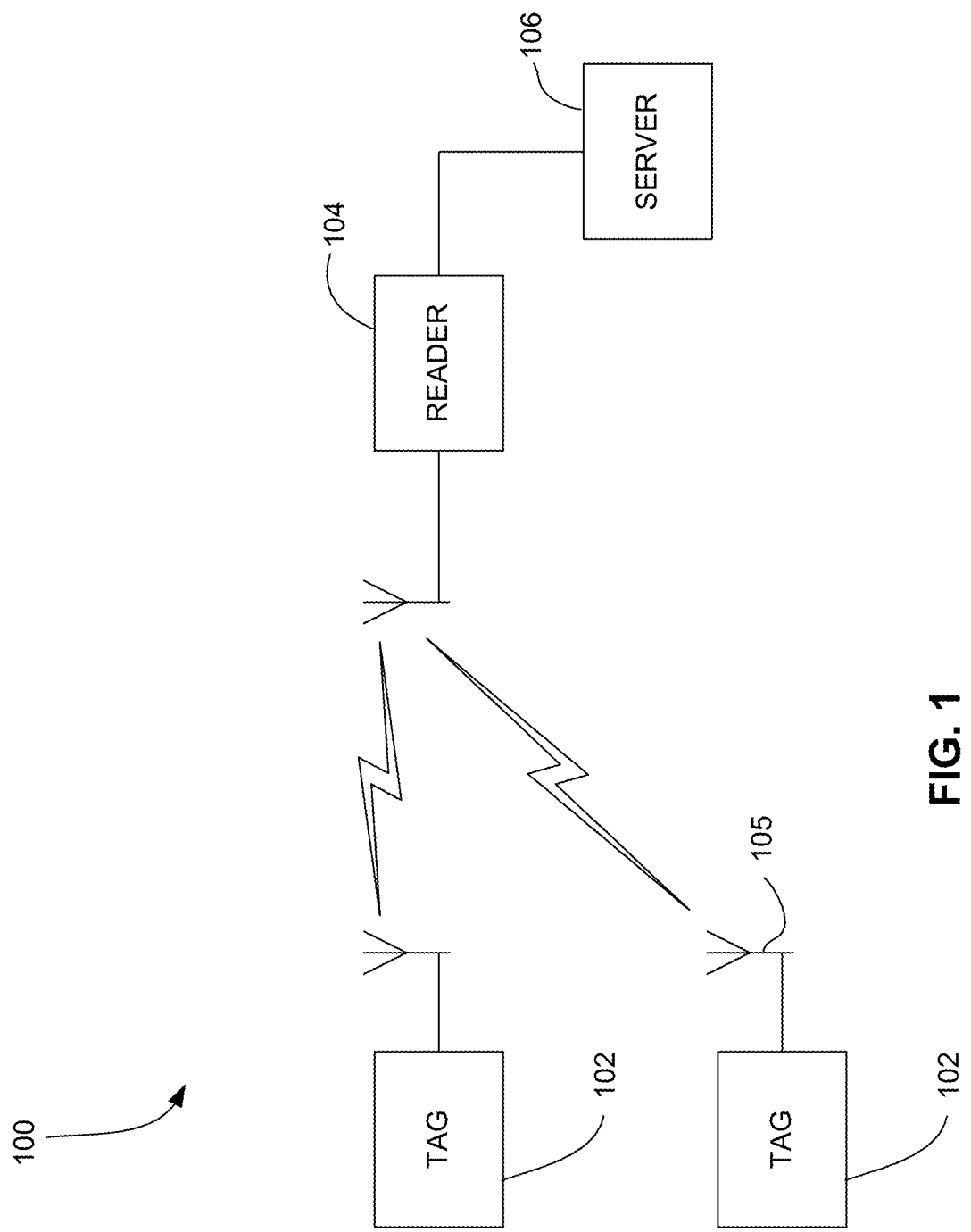
FIG. 1 is a system diagram of an RFID system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Critical to the delivery of many products is validating not only the source and provenance of the product, but that producing and shipping of the product was also completed with the required process steps and/or parameters. The processing and later handling of the product often impact the condition, such as quality or safety, of the product seen upon delivery. Therefore, ingredient source information and the production processing steps and/or related parameters, as well as the timing, location and conditions of shipping the product to the customer, should be validated.

According to various embodiments described herein, a digital ledger, such as a blockchain, is utilized for a variety of purposes, such as to securely store sensor data values and analytics data values that validate the completion of a process or process step thereof, and/or the parameters associated with a processing step, and/or the shipping conditions of the product. For example, one or more data elements stored in a transaction in the blockchain may correspond to completion of one or more process steps in a production process of the product. A blockchain may also be used as a secure ledger whose content can be used to authenticate the source of the product by validating the specific location or component sources, and/or validate a transaction between two parties, and/or provide a trace-able history of all transactions related to the item.

Any known digital ledger or blockchain model may be used, in various embodiments. In general, a digital ledger or blockchain is a peer to peer interconnected distributed database, or ledger, that maintains a continuously growing list of records, called transactions (also referred to herein as blocks), secured from tampering and revision. Each transaction preferably contains a payload having relevant information, such as a timestamp and a link to a previous transaction and is encrypted resulting in a unique hashcode. By design, blockchains are inherently resistant to modification of the data entered therein through their peer replicated transaction data, in that once a transaction is recorded and populated in multiple independent blocks, the data transaction recorded cannot be altered retroactively, as alteration of one entry would lead to easily detectable inconsistencies. Through the use of a peer-to-peer network and a distributed timestamping server, a blockchain database may be managed autonomously.

Sensor-recorded data elements related to each process step, process parameter, shipping condition, and/or storage condition, and/or equivalently information derived from such data elements, can be entered in a blockchain for the product, e.g., in an entry for the payload of a transaction in a blockchain, which becomes part of a block, reflecting an additional transaction in the digital ledger or chain of the product history. This provides an authenticated, immutable and referenceable record of the processing steps, and/or processing parameters and/or shipment conditions. The use of a blockchain enhances normal communication of these facts, by providing a robust and peer-to-peer communication platform, data store redundancy, encryption, and a secure hash of the contents of these production steps that are directly attributable to the product. The information from these steps become part of the blockchain, and therefore part of the recorded and shared product history.

A process step may be any step performed while in production or preparing the product for shipment. Examples of processing steps include temperature adjustment, e.g., cooling; grading; washing; sorting; trimming; mixing; packaging; storing; etc. An identifier of the entity performing the processing step, conditions associated with positive or negative completion of the processing step, timestamps denoting when, including the start and completion times, the processing step was performed, etc. may be stored in the blockchain.

The parameters, e.g., data elements, associated with a processing step may be any measurable or recordable parameter associated with the particular process step, or a summary or derivative result based on an afore mentioned parameter, any or all of which may be stored as part of a transaction within one or more transactions (blocks) in the blockchain. The parameters may include any attributes of the product and/or its environment during the process step, or any combination or calculation combining the product attributes, environment, and/or product parameters. For instance, one or more data elements may correspond to a process parameter in a production process related to the effectiveness of the process step on the product. For example, a parameter associated with a washing step may include the temperature of the bath to ensure it was hot enough to kill bacteria of interest, the duration of the bath, and/or a test result of the water used in the bath at that time to show it had the proper composition and a lack of contaminants.

Such parameters may also and/or alternatively include one or more of the shipping condition attributes listed below.

In preferred approaches, the parameters may include sensor-recorded data elements related to information selected from the group consisting of: product condition associated with a consumer product at a particular time and/or place, location associated with the consumer product at the particular time and/or place, and current state associated with the consumer product at the particular time and/or place. The data elements may include, for example, the raw data recorded by one or more sensors, information derived from such raw data, and combination thereof. A consumer product may be defined as any product that is created or grown, and ultimately sold to and/or used by a consumer (person or entity).

The recorded data elements for fresh produce may include, but are not limited to, any or all of the following: product harvest temperature, harvest time, amount of precipitation in preceding 24 hours, outdoor temperatures in the preceding 24 hours, time until product is cooled to low temperature, low temperature product is cooled to, current product temperature, dwell time of product temperature at specific temperature ranges, estimated remaining shelf life at a specific point in time and/or at a specific process and/or transaction point, moisture content of product, Brix ratio of product or similar product from the same plant/bush/tree at a point in time, color reading, photo spectroscopy reading, hyperspectral reading, reflectivity reading, product weight, product dimensions, and/or other product measurements and/or conditions of the entire product or specific features of the product.

The information stored in the blockchain regarding the process steps and their parameters (e.g., data elements) provides an auditable record that enables verification not only that a process was completed, but also that it was completed correctly. Moreover, such stored information may contain identification, conditions, and/or parameters related to the equipment of consumables used in the processing, for example the condition (temperature, alkalinity, chemical composition, possible contaminant testing results) of the water used in washing. Moreover, such information is indicative of the condition of the product upon completion of processing. Such information is invaluable for food safety, remaining shelf life, accountability, food recalls, pharmaceutical efficacy, pharmaceutical recalls, etc. Moreover, such information provides verification that a service provider performing the process step is performing them according to an agreement to provide such services.

Shipping conditions may include any desirable information associated with the shipping of the product. Preferred embodiments include identification of the owner or custodian of the product at each point in the shipping process for which an entry for a payload of a transaction (block) is created.

Shipping conditions may include various attributes of the product at various stages in the shipping process. The various attributes that are monitored or assessed may include one or more of humidity, pH levels, temperature, firmness, sunlight, ultraviolet light, atmospheric pressure, chemicals, radioactivity, pathogens, presence of bacteria, presence of viruses, presence of prions, carbon dioxide level, ethylene levels, etc., rates of change for any attribute, or any other data which would be desired and/or apparent to one skilled in the art upon reading the present description. In other embodiments, the various attributes may include any information on environmental characteristic that may affect the shelf life or expiration of the good being monitored.

Storage conditions may include any of the attributes noted above for shipping conditions.

The recorded attributes for fresh produce during shipping may include, but are not limited to, any or all of the following: current product temperature, dwell time of product temperature at specific temperature ranges, estimated remaining shelf life at a specific point in time or at a specific process or transaction point, moisture content of product, Brix ratio of product or similar product from the same plant/bush/tree at a point in time, color reading, hyperspectral reading, reflectivity reading, product weight, product firmness, product dimensions, and/or other product measurements and/or conditions.

Data elements corresponding to the process parameters and/or shipping conditions may be received from and/or derived from a sensor on a wireless device/tag associated with the product and ideally coupled to said product during processing and/or shipment of the product. The wireless device may be any type of device capable of sending a sensor reading over a wireless link. For simplicity, much of the present description is described in terms of a sensor tag. This has been done by way of example only, and any type of wireless device, including those with integrated and/or external sensors may be used in various approaches and embodiments.

The coupling of the wireless device may be direct, e.g., as sensor the device/tag is adhered to the product, or indirect, e.g., the sensor tag is coupled to a pallet, container, vehicle, etc. holding the product. For example, device/sensor reading may be taken by a sensor according to predefined criteria, e.g., periodically (at regular time interval), upon occurrence of some stimulus such as a change in custody, at specific process points, etc., or based on the current product location (e.g., geofencing), or a change in one of the product parameters, etc. The tag may store the readings for later retrieval by a reader device or access point, which in turn may upload the readings to a server for generation of a transaction for the entity's or product's blockchain. Preferably, the device/tag is authenticated using known authentication techniques, thereby ensuring the authenticity of the information so derived, and the data on the tag is encrypted and secured, such that it is resistant to tampering when transferring the data to the transaction.

Attributes and/or parameters associated with the product may be gathered and/or derived from data elements utilizing a sensor network. According to one approach, sensor network devices (e.g., Radio Frequency Identification (RFID) sensors, Bluetooth sensors, Wi-Fi sensors, cellular sensors, etc.) may be used to collect data pertaining to the condition of the product. Moreover, in other approaches, sensor network devices may be used to continuously collect environmental data pertaining to the product.

Information corresponding to the process step and/or process parameters may be derived from a machine used in a process step, and/or equipment (e.g., sensor on or near the machine, monitoring device, computer, etc.) that generates the relevant information as the machine processes the product. For example, the machine or equipment may provide the relevant data elements to a server for inclusion in an entry in the blockchain, to a tag coupled to the product, etc. This information may thus correspond to a process parameter in a production process related to the effectiveness of the process step on the product, e.g., whether a temperature in a washing machine was high enough to kill bacteria, whether a temperature in a cooler was low enough to cool the product sufficiently quickly, etc.

Moreover, a data element may correspond to a post-production test of equipment condition, calibration and/or possible contamination that reflects the quality and/or safety of products produced by the equipment. Information derived from such data elements may be stored in the blockchain.

Preferably, the machine or equipment is authenticated by the server, tag, etc. using known techniques to ensure authenticity of the information used to create the data, and the data is encrypted and secured, such that it is resistant to tampering when transferring the data to the transaction in the blockchain. To combat tampering, the machine or equipment is preferably reauthenticated at some point or points, e.g., periodically (e.g., once per day, once per week, after a predetermined number of transactions occur, etc.), according to some schedule (e.g., every hour, every week, every month, etc.), upon occurrence of some event, etc. To ensure accuracy, the machine or equipment may be calibrated, and that calibration information (such as the time of calibration, the results of calibration testing, and who performed the calibration) may be added to the record provided by the machine or equipment.

Moreover, a sensor that recorded data elements may be authenticated at any time for ensuring authenticity of the sensor.

In some embodiments, only data elements received from authenticated devices is allowed to be used for creation of blocks. Devices such as tags, sensors, equipment, machines, etc. may be authenticated by any known technique, such as key exchange, random number generation, etc. In a preferred approach, the coordinating entity creating the blocks also conducts the authentication.

At a computer system, the data elements (e.g., parameters, attributes, data, etc.) may be gathered via a network connection and used to generate an entry for a payload of a blockchain transaction, e.g., block entry. Any known mode of communication may be used to communicate the information described herein from a source, e.g., sensor, to the destination, e.g., computer system. Preferably, the mode of communication includes a network, e.g., as described elsewhere herein. Moreover, the information may pass through multiple intermediary devices en route to the destination.

In one approach, when the device/tag associated with the product is detected at a waypoint (e.g., a physical location or a specific instance of processing equipment), this event causes a transaction to be generated in response to such detection. Crossing the waypoint, which may correspond to completion of a process step, results in a notification the tag was detected at the waypoint being received by the computer system, which in turn generates an event or transaction in response to the notification. This in turn may initiate creation of a transaction (block) to be added to the blockchain.

Upon creation of a transaction, based upon the determined rules governing what is defined as a transaction event, the transaction is added to the blockchain. The various blocks and/or ledgers may be stored anywhere, e.g., at the computer system, in a cloud system, etc. Moreover, there is no requirement that the blocks and/or ledgers be stored on a single system. Rather, they may be distributed across different servers, and access to them is seen through the chain.

By creating transactions to be stored in the blockchain, not only a traceability history is constructed, but also a condition history of the product.

In various embodiments, the transactions may include raw data and/or summary data derived from the raw data.

For example, summary data may include a metric or code generated by detecting the condition of the product and estimating a remaining shelf life of the product based on the condition.

In another example, data and/or decisions associated with actively managing food delivery may be used in creation of entries for the payloads of transactions in a blockchain. One approach for actively managing food delivery from which transactions may be derived is set forth in U.S. patent application Ser. No. 15/085,288 filed Mar. 30, 2016 to Mehring et al., which is herein incorporated by reference.

In yet another example, images and/or image information, such as photos and/or information derived from photos, may be stored in blockchain transactions. In one approach, photo analytics may be used to interpret images captured of a food product, e.g., for the purpose of food product inspection, quality determination and shelf life prediction, as set forth in U.S. patent application Ser. No. 15/205,296 filed Jul. 8, 2016 to Mehring et al., which is herein incorporated by reference. Such food products may be fruit, produce, meat, seafood, prepared foods, etc. Results of the analysis may be used to generate a transaction (block) for the blockchain having the results and/or other information based on the results. The results may also be stored, sent to a party associated with the product (e.g., grower, vendor, transporter, etc.), etc.

Multiple images of the product taken along the supply chain may be assessed, and compared to determine relative changes in the product as it traverses the supply chain. Results of the comparison may be used to create a transaction (block) for the blockchain transactions having information indicative of and/or derived from such comparison. The product may travel with the objective reference. However, where copies of the objective references are used at the various points of the supply chain, where such copies are identical, an accurate comparison of the same product at different times can be made. For example, the relative change in characteristics of the product from one point to another along the supply chain can be accurately determined.

An action concerning the product may be taken based on the assessment, such as selecting a destination of a particular transit time relative to the remaining shelf life. In one approach, the assessment may be used to route the product to a particular destination based on its characteristics. For example, strawberries having a lighter shade of red may indicate having been harvested early, and therefore may be routed to a more distant destination because they will have a longer shelf life than strawberries harvested late, as evidenced by a deeper red color. Similarly, salmon exhibiting separation between fat and protein, as detectable by comparison to a texture of the objective reference, may indicate that the salmon is past its ideal freshness, and so should be routed to a destination for faster sale. Moreover, strawberry samples exhibiting a smaller size may be routed to destinations requesting smaller strawberries, and vice versa. Decisions relating to the selected routing may form the bases for the data within a transaction or a triggering event that initiates the creation or an update of blockchain transactions.

Compliance with process specifications and requirements may be validated by assessing one or more transactions in the blockchain. An example of the use of an approach to capture information useful for process compliance validation with blockchain as an auditable data store is in the processing of fresh produce. This example should not limit the scope of this invention, as anything that is processed as part of a product production process may benefit from this approach. For fresh produce, key product conditions and processing parameters directly influence the remaining shelf life, or freshness, and the food safety of the product, and therefore impact the value of the product shipped. Ensuring the key product conditions, processing steps and parameters are compliant with the represented product is essential to validating the value of the shipped product. For instance, the shelf life of a strawberry is impacted by the temperature of the strawberry at the time of harvest, the time it takes to cool the strawberry to 34° F., and the confirmation of the processing step that resulted in the strawberry being cooled to 34° F., and validation that the 34° F. temperature was maintained through delivery to the customer. While variations in the processing times and product temperatures are common, recording the variations and evaluating their impact to remaining freshness is essential to determining the true value of the delivered product. It is proposed to use a blockchain (or digital ledger) to store these critical values, or representative summaries of the values, at specific processing steps or transaction points (i.e. product shipping or receiving), along with product ownership, location and other traceability information. This will help facilitate the trade, or exchange of the product as the product conditions are reflected as part of each transaction.

As noted above, authentication of the source of the product, e.g., a grower of a food product, may also be enabled according to various embodiments. For example, an identifier of the source of the product may be stored in a transaction (block) in the blockchain transaction entry, as may an identifier of any owner and/or custodian of the product. The identifier of the owner or custodian of the product may include any type of information associated with the identity of the owner or custodian, such as an identifier (ID), a location (e.g. GPS coordinates), a name, etc.

A sequence of two or more transaction data payload elements may be assessed for authenticating various aspects of the product. This is particularly useful, as the information about the product as it passes through various stages of the production and/or delivery process can be considered together to ensure nothing has occurred that could call into question the authenticity of the stated characteristics of the product, such as its origin. For example, a sequence of two or more transaction data payload elements may be assessed for authentication of the source of the product. By tracking the blockchain information about the product back to the source, a high degree of certainty that the proffered source of the product is correct can be had. In another approach, a sequence of two or more transaction data payload elements may be assessed for authentication of the pedigree (e.g. organic, free range, sustainably harvested, DNA source—Black Angus, etc.) of the product.

The blockchain model described herein helps ensure that information stored about the processing and shipping of a product are accurate and authentic. Entities at any point in the product lifecycle may be able to derive useful, accurate, and authenticated information by examining the transactions in the blockchain. For example, the receiver of the product can determine that when the product was shipped, it was shipped in the appropriate condition. The shipper may also determine that the receiver received the product at the appropriate condition, thereby eliminating the suspicion that the shipper knowingly did not ship the product with the correct remaining shelf life, but perhaps believed the receiver would not catch it. The blockchain may also prevent a receiver from knowingly rejecting a product because, for instance, the receiver has too much inventory already, even if all the relevant product criteria are met.

Because the transactions in the blockchain cannot be altered in preferred embodiments, the blockchain provides a trusted ledger in the sense that all parties know that no one has manipulated it.

Moreover, where the blockchain provides a trusted ledger, it may enable automatic acceptance, or other decision making based on product condition, of the product based on the information in the blocks meeting predefined criteria.

In addition, the blockchain may enable "automated" inspection and/or acceptance based on the authenticated blockchain record of the product. This could be used to expedite customs, FDA, and audit reviews of imported food, as well as commercial inspections for retailers and restaurants. As all of this auditable data is stored in a common digital form, it also enables the automation of such record review, whether in real time or as part of a historic review. This improves compliance coverage, which of is only sampled at present time due to resource constraints.

As inferred by descriptions herein, the data stored I the blockchain may also provide information useful when a problem with the product is discovered, such as premature spoilage, defect that requires a recall, etc. For example, because physical quality control only tends to discover mechanical damage to a food product, it doesn't catch more subtle details associated with ripening process, respiration rates, biologic transformations, chemical changes, etc. Conditions at the cellular level cannot readily be determined by visual inspection, and DNA, biologic incubation or chemical testing takes too long to be practical for perishable items. Accordingly, by recording other relevant parameters in the blockchain, conditions at the cellular level can be estimated with a high degree of accuracy. For example, rather than performing Warner-Bratzler testing on meat, temperature and acidity (pH levels) can be recorded along the processing and supply chains, and evaluating the data to determine actual tenderness. Acidity reflects the toughness of the meat and how the meat has been handled. Readings related to acidity and temperature, as stored in the blockchain, are not only useful for estimating the freshness of the meat and shelf life, but also the quality of processing that led to the acidity.

Product quality can also be derived from information in the blockchain. For example, if aged meat is aged properly, the acidity drops and the quality is higher, perhaps warranting a higher price. The quality of the product may be assessed by assessing characteristics of the product based on a summary of some or all of the data elements captured in some or all transactions associated with the product, and assessing a quality of the product based on the characteristics.

The blockchain is also more secure and accessible than current methods, such a barcoding to identify the source of the product. The security comes from the robustness of the distributed and immutable records of transactions within the blockchain, and it is accessible as the information is in a standardized, peer-available and shareable format. Suppose there is a recall of a product and only the barcode identifies the source. However, assume the barcode cannot be read or cannot be correlated to any entity. This can result from something as simple as a bad printer that didn't work the day it was printed, the code becoming obsolete in that it is no longer associated with any entity due to passage of time, or the code on the product doesn't match the product. In one embodiment, the barcode scan is entered into the blockchain ledger at the source of the product. A second form of identity verification can also be stored, one that would validate the barcode scan, such as a user login, or device authentication.

In one example of utilizing the teachings herein, which is presented by way of example only and not meant to be limiting, a small device, e.g., a tag, is coupled to a container of food at the field level during harvesting of the food product, e.g., produce. The tag captures a button press in the field, so there is no infrastructure required, and that button press is captured on the device as a time stamp, optionally capturing the current location. The tag also begins recording temperature, humidity and/or any other desired parameter or condition on a periodic basis, conditional basis, continually, etc. e.g., as data elements. When the product arrives at the processing plant, an access point reads the tag data. That access point is authenticated, e.g., via two-way authentication, preferably with a GPS location so the gate's location is known, and a transaction is created. The access point may validate the history it just read because it knows the key to the tag and the tag can be encrypted with a key using known techniques. Therefore, when the tag is read by the access point, an entry for the payload of a transaction is created, and the resulting transaction (block) is added in a specified blockchain ledger. The entry in the transaction may indicate what the product is, along with a series of identifiers and product condition data. Additional information may be stored in the transaction, such as a timestamp indicating when the product was at this location, what the conditions were when the product was harvested, the time the product was harvested by correlating that to the button press, and the conditions since then.

Once at the processing plant, a barcode sticker with a tracking number may be attached to the container, e.g., for warehouse-based tracking software. The barcode sticker may also be correlated to the grower of the product, e.g., in a lookup table. The barcode on the barcode sticker may be associated with the tag ID, e.g., by scanning a barcode on the tag, thereby tying the warehouse tracking system together with the product history recorded in the already established product blockchain. Information about this exchange, including the warehouse tracking number, may be stored in the blockchain, providing for future association of the warehouse tracking number with product information.

In the processing plant, the cut to cool time, may be tracked and information about it stored in the blockchain. One component of cut to cool time is field to the yard time. The grower may be responsible for this portion of travel, and can be held accountable for any delays in delivery. Therefore, parameters and conditions for this portion may be recorded, e.g., as data elements.

Another part in the cut to cool time is from the yard into the cooling system and how quickly the product is cooled to the target temperature, e.g., 34 degrees. The time and temperature information for each stage may be derived from information captured by the tag as it moves through each stage, and a transaction (block) created for each stage.

When the product enters the yard, it comes under the processing plant's ownership, and this change in ownership may be a transaction, resulting in another transaction added to the blockchain. Then when the product comes into the pre-cooler, that may be considered another process step, so an access point may be positioned at the pre-cooler equipment to determine when the product came into the cooler and when it came out, along with temperature data such as temperature transition data. Illustrative cooling types include forced air pre-cooling, vacuum cooling, hydro cooling, top-icing, etc. Each cooling unit may have an access point just for that piece of equipment to identify when the product comes in and when it comes out, as well as the processing time and any equipment specific parameters. Additional process steps may also occur, such as washing, partial pre-cooling followed by another process step and then final pre-cooling, etc. Information from each process step such as time, equipment ID, temperature, etc. may be stored as an entry for part of the data in a transaction in a product specific blockchain.

The information so captured and stored in a transaction (block) in the blockchain enables authentication that that process was done properly. This information may be critical because the grower, if it is independent from the processor, pays the processor to complete that process, e.g., precooling the product because that is what extends the shelf life. And if the precooling is not done completely or not done in a timely fashion then the processor has not provided the full value of its service.

Accordingly, by validating and authenticating that the process was done correctly, value is provided to the grower and to the processor to know that the product was delivered on time and processed correctly. At this point, the blockchain for the specific pallet of product now has an authenticated record to show these two things happened properly and timely.

The pallet of product may then be placed in storage.

Optionally, based on the information stored so far for all of the processing up until that point, e.g., within the first 12 to 24 hours, an estimated shelf life of the product may be calculated, and stored as part of the transaction data in the blockchain for each pallet of product.

In the case of mixed products, such as bagged salads, the life of a bag salad is determined by the ingredient having the shortest remaining life. Once one ingredient spoils, the entire product is generally disposed of. Using an embodiment, each ingredient can be authenticated individually, and those ingredients having similar remaining lives may be matched for mixing together. This also provides a consistent and reliable shelf life for the mixed product.

Continuing with the bagged salad example, the ingredients have to be washed before bagging. Characteristics of the washing step, such as amount of chlorination of the wash water, resident time of the lettuce in the wash, possible contaminant levels, etc. may be recorded in the transaction data of the related blockchain, thereby providing validation of proper washing. Accordingly, washing, pre-cooling, and any kind of processing step can be validated and authenticated and used to trigger a transaction. Thus, transactions may correlate to a process at a granular level, e.g., to completions of each process step. This may be considered a change of state of the product.

A summary code at the completion of all processing may be generated, and that may form the basis for triggering another transaction. That summary code may be used, for example, to perform intelligent routing of the product to its destination, based on a forecast remaining shelf life. Items with a shorter remaining shelf life may be routed to stores located nearby while items with a longer remaining shelf life may be routed to more distant stores.

According to various embodiments, anything that can be a basis for decision may be placed into the data payloads of each transaction of the related blockchain. Moreover, the aforementioned validation and authentication helps ensure that the product has been processed correctly and has not been counterfeited or adulterated.

Continuing with the foregoing example, an access point may be located at the shipping dock, and when each pallet gets loaded, the pallets can be identified and counted. The summary code can be checked, thereby validating that the product has been correctly routed, and a transaction record can be created and a transaction (block) added to the blockchain with information about the loading. Using such information, one can determine that the product was loaded at the correct freshness, and that, based on the expected transit time, the recipient will receive the product with the recipient's specified remaining freshness. The recipient may have its owns days of distribution and sell-through time, and how much time they want for the consumer. A determination can be made at the loading dock that the product has met that criteria.

By identifying the product at the entry to the shipping phase, and its estimated shelf life, the recipient is given remote visibility of the product. Moreover, the quantity of products coming to the recipient can be validated, e.g., by the count of pallets that went on the truck. Each one has the tag and each one is authenticated. Also, by entering a transaction for each pallet, the conditions of each pallet can be assessed. For example, assume 26 pallets are to be shipped. During loading, 22 pallets had the right freshness but say there were not enough additional pallets with the right freshness. Evaluation of the data by a blockchain smart contract would expose any attempt to try to add 4 remaining pallets with product that doesn't meet the proper criteria, potentially notifying the different parties as to the exception. It follows that the party responsible for loading the four deficient pallets would be accountable, rather than the trucker. The person who was responsible for that decision may also be ascertained. While previously a retailer would have had to wait until the products arrived to ascertain their condition, using various embodiments of the present invention, the retailer has visibility of the state of the products at the start of shipping. If the retailer chooses to accept the four deficient pallets anyway, the retailer, knowing the pallets have inferior product, can take an alternate action, such as giving those products special handling, requesting a discount, etc. well before the truck arrives.

A similar scheme may be present on the receiving end of the shipping route. An access point may be positioned at the receiving door, whether it's at a restaurant or a retailer. When the product arrives, the condition the product arrived in can be ascertained, and is recorded in a transaction (block) as a transaction in the product blockchain, because the product and its environment can be monitored throughout the transit segment through each pallet. Each pallet coming off the truck may be a transaction on its own, or part of a purchase order or shipment. The tag records and/or reports what its sensor has captured, e.g., during shipping and at the receiving dock. This information may be obtained from the tag and recorded in a transaction as a transaction in the product blockchain. The net result is an entire chain of transactions from initial harvest to yard, to pre-cool event to put away, to storage, to routing decision, shipping and receiving. Not only does the blockchain provide traceability and chain of custody, but may also identify who made what decisions to deliver fresh product.

Another embodiment entails secure delivery of a product in a package that can be secured and then opened only by a recipient and not the delivery person, thereby preventing tampering. Examples of products for which this embodiment is particularly useful are foods from a restaurant or grocer, pharmaceuticals, etc. One approach secures the delivery container with an electronic lock, such as a Bluetooth lock, which a delivery person cannot open but the recipient can. For example, the unlock code may be sent to the recipient, possibly received through a mobile application that uses the one-time key to unlock the electronic lock.

While a locked container prevents tampering, the actual source of the locked container may be unknown, e.g., perhaps the sender is not really the restaurant. By using a blockchain to authenticate the source of the locked container, certainty of the source can be achieved. An access point at the sender may initiate a transaction when the container is locked. On the recipient, a mobile device such as a phone may be used as the access point for a local connection via Bluetooth or NFC. The mobile application may push data related to the receiving of the product, such as the unlocking of the container or the condition of the contents, back to the blockchain coordinator cloud, e.g., where the transactions are recorded. The provides remote visibility and an effective trusted audit record of a completed transaction with a remote receiver.

Sensors may be used to monitor conditions of the container and/or product during delivery. For example, a temperature sensor may record temperature. A light sensor may detect opening of the container. A humidity sensor may detect a drop in humidity around warm food, indicating someone opened the container. Any of these sensor readings may be added to a transaction or transactions within the associated blockchain. Other sensors may detect tampering, exposure to undesirable conditions or contaminants, or other conditions that could adversely affect the product.

In any of the embodiments described herein, the blockchain transaction data may be made available only to selected parties, may be made available to all subscribers, etc. In a preferred approach, each organization has a blockchain peer or peers with an established identity, with each peer joining a channel or channels that provides access to specified transaction data fields, e.g. some or all of the transaction data, for a specific blockchain ledger. The channel is a group of peers that can privately share specified transaction data for a given blockchain ledger. Each organization may have one or more applications that access the blockchain data via their own blockchain peer or peers. The applications that manage user interactions gain access to the blockchain transaction data through their associated blockchain peer. Different levels of security may be provided for different types of users, through the application security controls that provide access to the organization's blockchain peer, or through separate applications with different blockchain peer associations. The blockchain peer or peers associated with each organization would be granted the blockchain channel access based on their identification and authenticated certificates.

The blockchain network channel the organization peer is a member of may limit the transaction data—which portion of the transaction data payload—a particular organization can see. Moreover, summary codes may be used to summarize information, rather than providing the raw data, both for limiting access to the raw data as well as for storage an access efficiency. Use of summary codes, such as estimated shelf life, may be useful, for example, where a grower does not want the retailer to see low level details, such as cut to cool time, pre-cool condition, etc. Assuming the grower adhered to the proper procedures to attain the appropriate shelf-life, the retailer may not need to see the particular processing details. The growers, though, may be provided full access to the low-level details in cut to cool process, enabling them to gain insight into their business operations.

FIG. 1 depicts an RFID system 100 according to one of the various embodiments, which may include some or all of the following components and/or other components. As shown in FIG. 1, one or more RFID devices 102 (also referred to herein as RFID tags) are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. In some embodiments, the processor may be configured and/or programmable to perform or control some or all of the methodology presented herein. For example, the processor may be configured to perform various operations by way of logic programmed into a chip; software, firmware, or other instructions being available to a processor; etc. and combinations thereof.

For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as a product, a container, a device, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged. Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
 Identity tags (RF user programmable, range ~3 m)
 Lowest cost
Class-2
 Memory tags (20 bit address space programmable at ~3 m range)
 Security & privacy protection
 Low cost
Class-3
 Semi-passive tags (also called semi-active tags and battery assisted passive (BAP) tags)
 Battery tags (256 bits to 2M words)
 Self-Powered Backscatter (internal clock, sensor interface support)
 100 meter range
 Moderate cost
Class-4
 Active tags
 Active transmission (permits tag-speaks-first operating modes)
 ~300 to ~1,000 meter range
 Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra-high frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
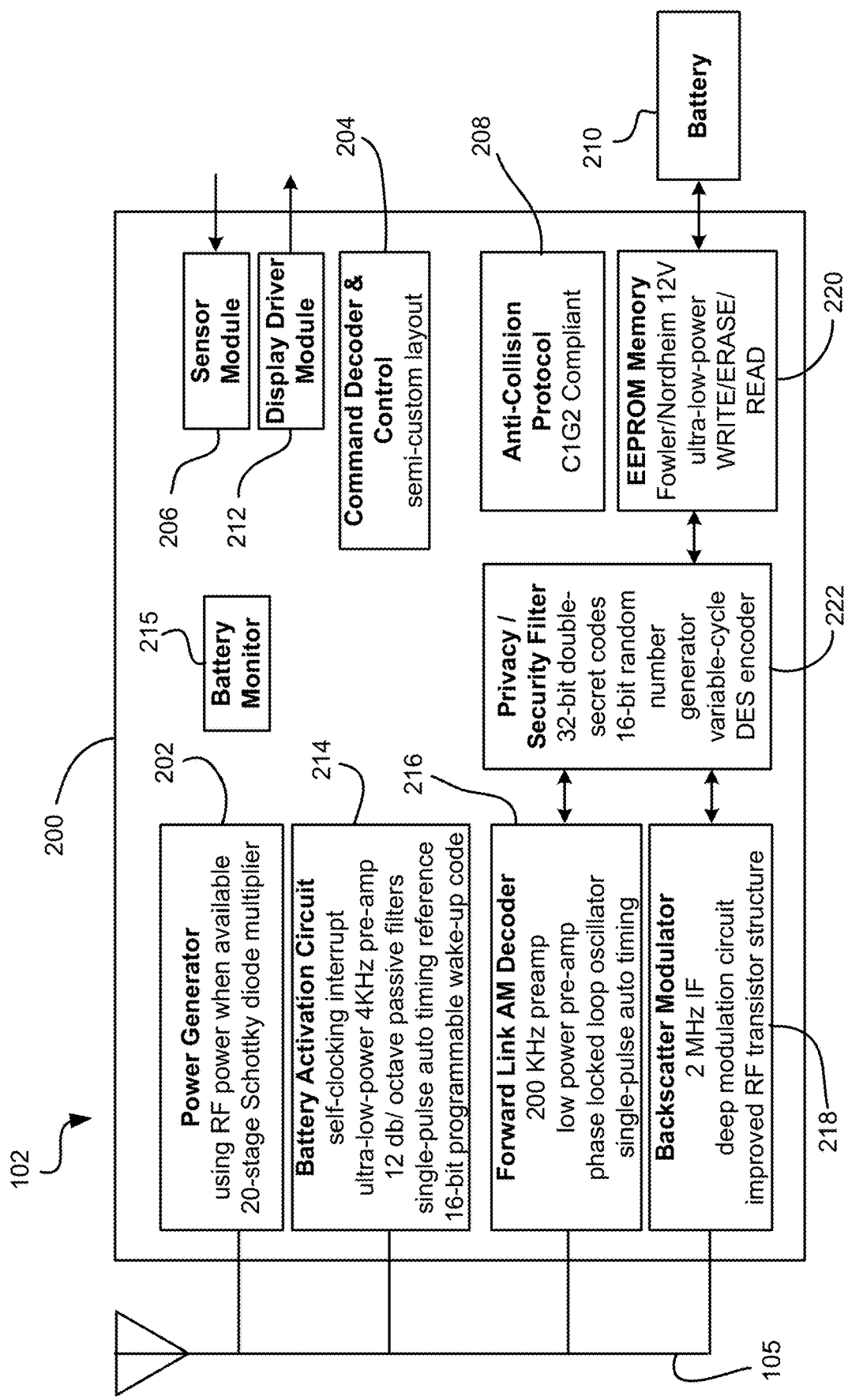
FIG. 2 is a system diagram for an integrated circuit (IC) chip for implementation in an RFID device according to one embodiment.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210, which may be managed by a battery activation circuit 214 and monitored by a battery monitor 215. A display driver module 212 can be added to drive a display.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 μA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

The module 200 may also incorporate a security encryption circuit 222 for operating under one or more security schemes, secret handshakes with readers, etc.

As alluded to above, tag data may be stored in memory on an RFID tag. RFID tag data can be any type of data element, including sensor data, origination and destination data, ownership data, data about the item to which affixed such as product contents, etc. The tag itself may have an "owner", where "ownership" may refer to outright ownership, as well as a level of control over the tag and/or its use, e.g., custody.

According to a preferred approach, the tag data may be uploaded and stored on a cloud-based data management system, such as the blockchain coordinator, along with ownership information, which may be assigned in the field and written to the tag.

Figure 3:
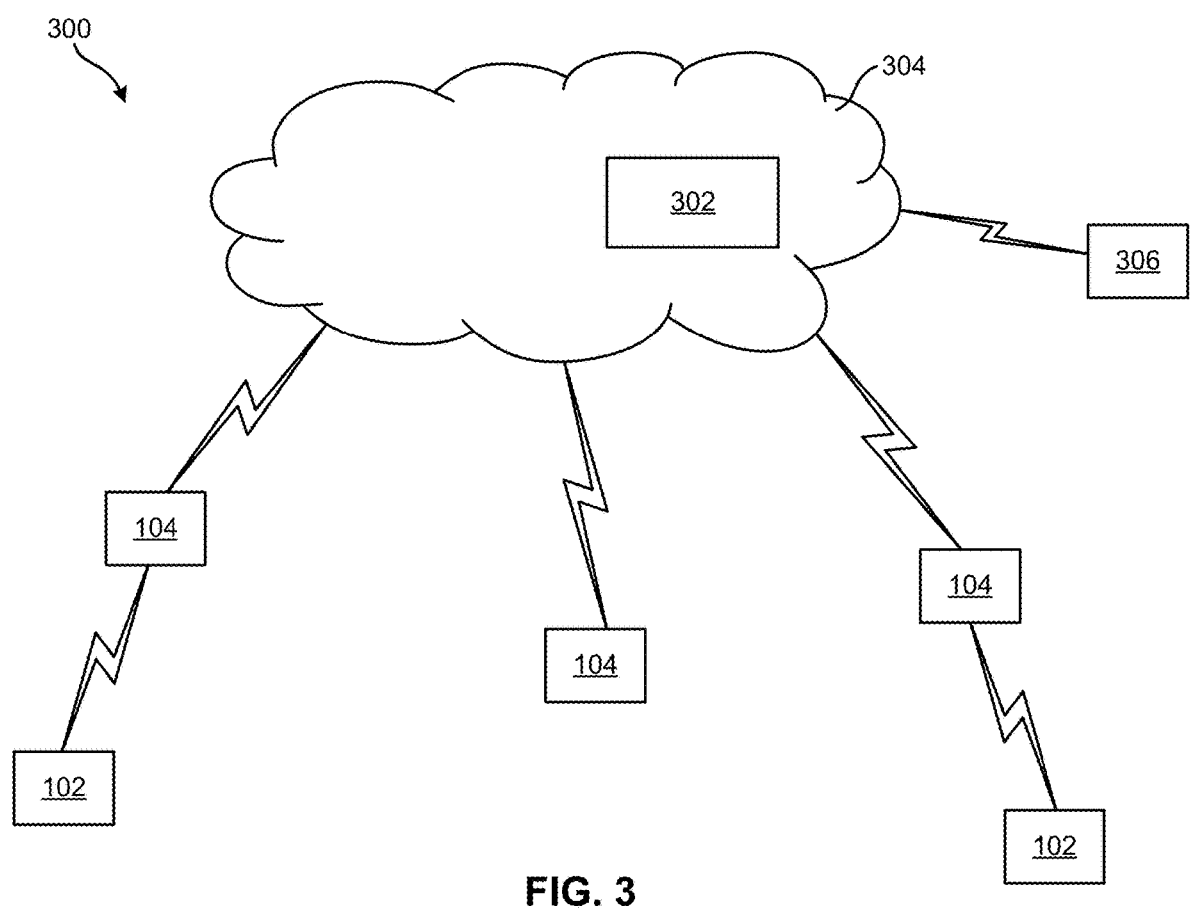
FIG. 3 is a high-level representation of a system architecture according to one embodiment.

FIG. 3 illustrates a high-level system architecture 300 that includes a cloud-based data management system that has a data management module 302 for storing and controlling access to RFID tag data. As used herein, the cloud-based data management system may include components from the ZEST™ system and/or service, available from Zest Labs Corporation, 2349 Bering Drive, San Jose, Calif. 95131, USA.

As an option, the present system 300 may be implemented in conjunction with features from any other embodiment listed herein, such as those described with reference to the other FIGS. Of course, however, components of such architecture 300 and others presented herein may be used in various applications and/or in permutations which may or may not be specifically described in the illustrative embodiments listed herein. Further, various components of the architecture 300 presented herein may be used in any desired environment.

As shown, the architecture 300 includes a data management module 302 residing in a "data cloud" 304, either of which may include one or more computing devices, one or more databases, one or more storage devices, one or more networking devices, etc. RFID readers 104 are in communication with the data management module 302 and/or cloud 300 via any type of known connection, including the internet, mobile telephony network, etc. The RFID readers 104 may communicate with one or more RFID tags 102 to read and/or write tag data and/or other data. Tag data received by an RFID reader 104 may be transmitted to the data management module 302, which may use such data to create transactions for the blockchain. Upon receiving a request from an authorized user, portions (or all) of a transaction in the blockchain ledger may be transmitted to a user device 306.

Figure 4:
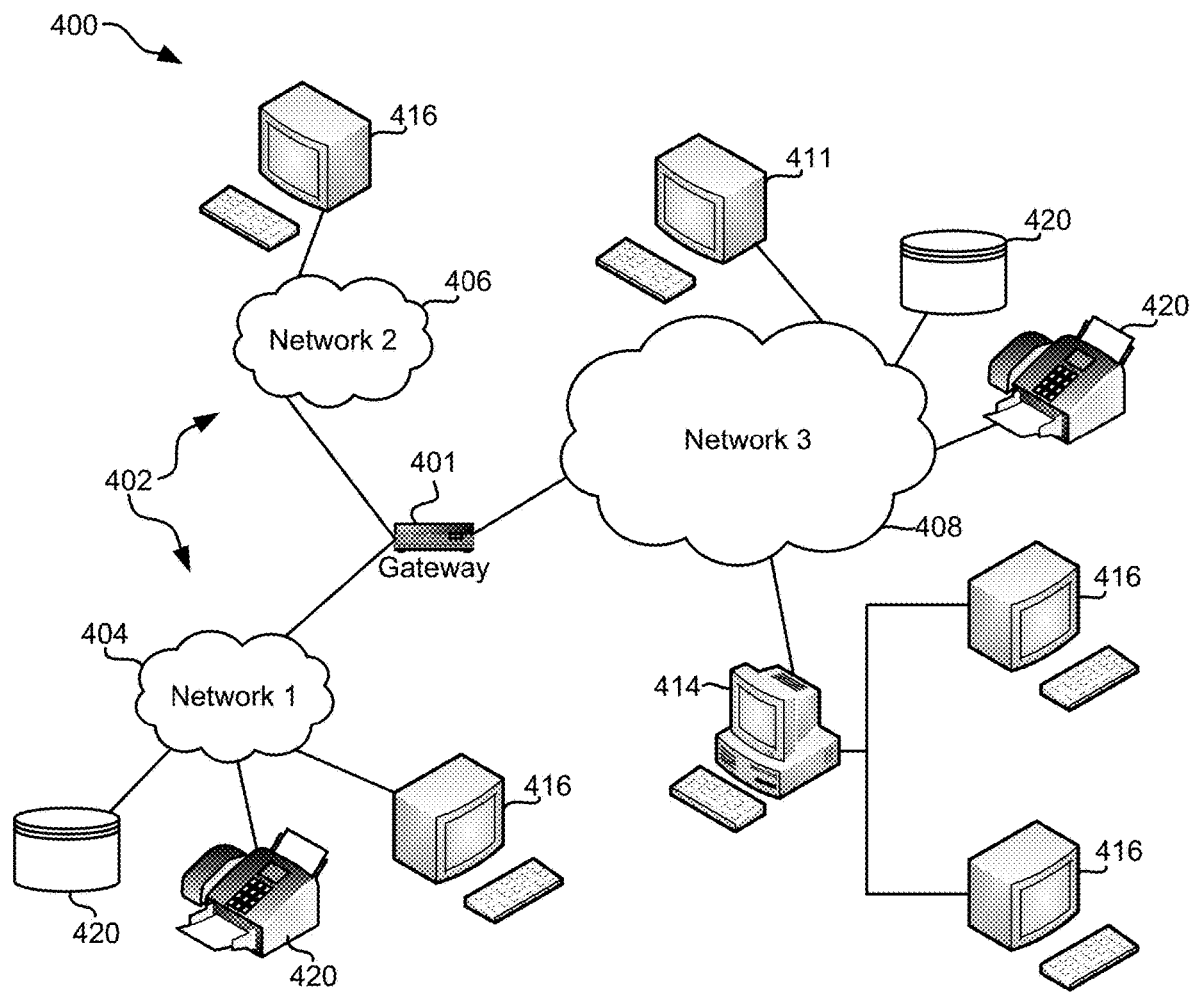
FIG. 4 is a network architecture, in accordance with one embodiment.

FIG. 4 illustrates an architecture 400, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

As shown in FIG. 4, a plurality of remote networks 402 are provided including a first remote network 404 and a second remote network 406. A gateway 401 may be coupled between the remote networks 402 and a proximate network 408. In the context of the present network architecture 400, the networks 404, 406 may each take any form including, but not limited to a LAN, a WAN such as the Internet, public switched telephone network (PSTN), internal telephone network, etc.

In use, the gateway 401 serves as an entrance point from the remote networks 402 to the proximate network 408. As such, the gateway 401 may function as a router, which is capable of directing a given packet of data that arrives at the gateway 401, and a switch, which furnishes the actual path in and out of the gateway 401 for a given packet.

Further included is at least one data server 414 coupled to the proximate network 408, and which is accessible from the remote networks 402 via the gateway 401. It should be noted that the data server(s) 414 may include any type of computing device/groupware. Coupled to each data server 414 is a plurality of user devices 416. Such user devices 416 may include a desktop computer, laptop computer, hand-held computer, printer or any other type of logic. It should be noted that a user device 411 may also be directly coupled to any of the networks, in one embodiment.

A peripheral 420 or series of peripherals 420, e.g. RFID readers, Bluetooth hosts, Wi-Fi routers, mobile telephones, tablets, networked storage units, etc., may be coupled to one or more of the networks 404, 406, 408. It should be noted that databases, servers, and/or additional components may be utilized with, or integrated into, any type of network element coupled to the networks 404, 406, 408. In the context of the present description, a network element may refer to any component of a network.

In some embodiments, the peripherals 420 may include RFID readers and/or wireless-communication-enabled mobile devices (e.g., Bluetooth, Wi-Fi, cellular, etc.) of a type known in the art. According to an in-use embodiment, which is in no way intended to limit the invention, the delivery container may include a wireless tag (e.g., an RFID tag, a Bluetooth tag, etc.) which may be read wirelessly by one or more peripherals 420. Thus, the wireless tag may communicate with the one or more peripherals 420. Moreover, data received from the storage controller may be pushed by the peripherals 420 to a network Network 1 and/or Network 3, e.g., which may provide a Cloud service in which the blockchain resides.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 404, 406, 408, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 5:
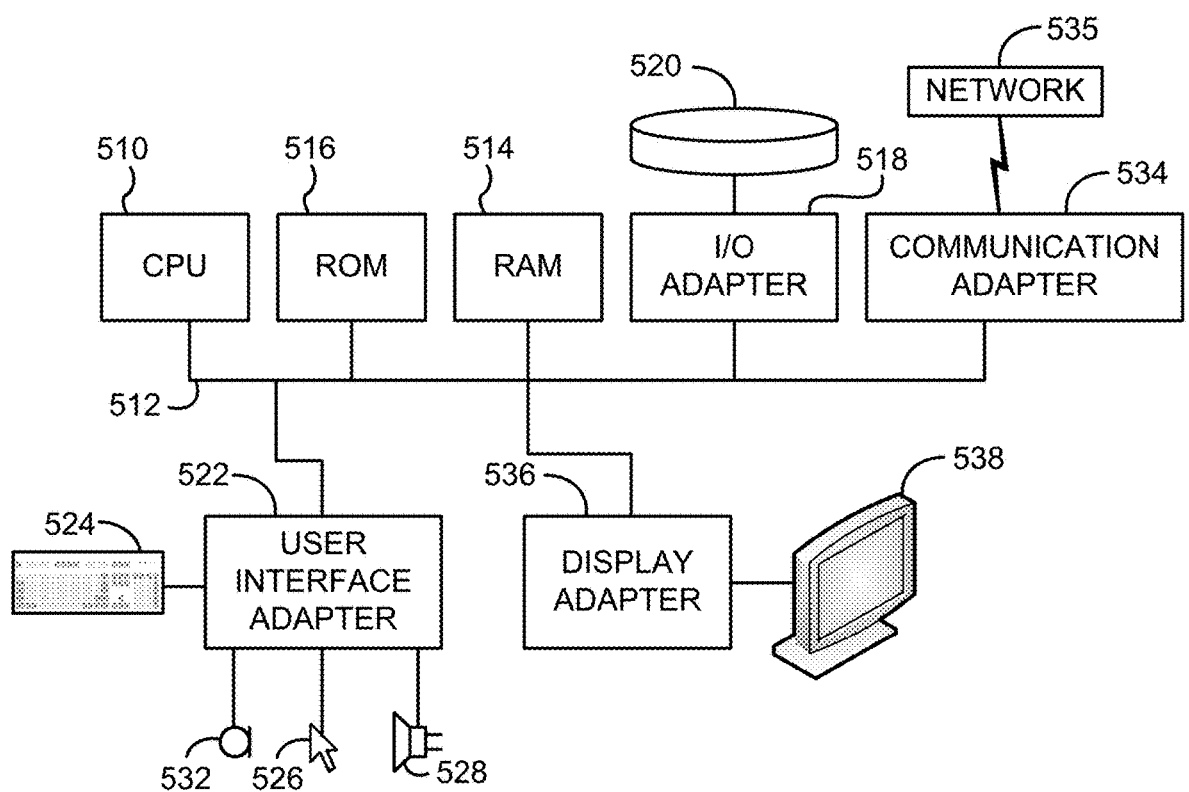
FIG. 5 is a representative hardware environment, in accordance with one embodiment.

FIG. 5 shows a representative hardware environment associated with a user device 416 and/or server 414 of FIG. 4, in accordance with one embodiment. Such figure illustrates a typical hardware configuration of a workstation having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

In some embodiments, the workstation shown in FIG. 2 may be (or at least include) a mobile device, e.g., a mobile phone, a tablet, a laptop, etc., of a type known in the art. The mobile device may use any operating system which would be apparent to one skilled in the art upon reading the present embodiment, e.g., such as Android operating systems, iOS, etc., depending on the particular mobile device used.

Moreover, the workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object-oriented programming methodology. Object oriented programming (OOP), which has become increasingly used to develop complex applications, may be used.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   receiving, over a network, one or more sensor-recorded data elements related to information selected from the group consisting of: product identification, condition associated with a consumer product at a particular time and/or place, location associated with the product at the particular time and/or place, and current state associated with the product at a particular time and/or place, wherein the one or more data elements are selected from the group consisting of: product harvest temperature, harvest time, time until the product is cooled to low temperature, low temperature the product is cooled to, current product temperature, dwell time of product temperature at specific temperature ranges, estimated remaining shelf life at a specific point in time and/or at a specific process and/or transaction point, moisture content of product, Brix ratio of product or similar product from the same source at a point in time, color reading, photo spectroscopy reading, reflectivity reading, product weight, and product dimensions;
   using the received data elements to create or update an entry for a payload of a transaction in a blockchain; and
   sending the entry for recording as a transaction in a specified blockchain ledger.

2. The method as recited in claim 1, wherein at least one of the one or more data elements corresponds to completion of a one or more process steps in a production process of the product.

3. The method as recited in claim 1, wherein at least one of the one or more data elements corresponds to a process parameter in a production process related to an effectiveness of a process step on the product.

4. The method as recited in claim 3, wherein the process parameter includes data elements derived from a machine used in a process step and/or equipment associated with the machine.

5. The method as recited in claim 4, wherein the machine is authenticated for ensuring authenticity of the data elements.

6. The method as recited in claim 1, wherein at least one of the data elements corresponds to a computation based on one or more of the sensor-recorded data elements of the product.

7. The method as recited in claim 1, wherein the data element corresponds to a post-production test of equipment condition, calibration and/or contamination that reflects the quality and/or safety of products produced.

8. The method as recited in claim 1, comprising authenticating a sensor that recorded the data elements for ensuring authenticity of the sensor.

9. The method as recited in claim 1, wherein at least one of the one or more data elements corresponds to a shipping and/or storage condition of the product.

10. The method as recited in claim 1, wherein the entry includes an identification of an owner and/or custodian of the product at the particular time and/or place.

11. The method as recited in claim 1, wherein the entry includes identification, conditions, and/or parameters related to equipment of consumables used in processing of the product.

12. The method as recited in claim 11, wherein the data elements correspond to sensor readings taken at regular time interval, at specific process points, and/or each time a custody of the product changes.

13. The method as recited in claim 1, wherein the entry includes summary data corresponding to a condition selected from the group consisting of: a condition of the product, and an estimated remaining shelf life of the product.

14. The method as recited in claim 1, wherein the entry includes an image of the product.

15. The method as recited in claim 1, comprising assessing characteristics of the product based on a summary of some or all of the data elements captured in some or all transactions associated with the product, and assessing a quality of the product based on the characteristics.

16. The method recited in claim 15, whereby an action concerning the product is taken based on the assessment.

17. The method as recited in claim 1, comprising assessing data in the transaction payload for validating process compliance.

18. The method as recited in claim 1, comprising assessing a sequence of two or more transaction data payload elements for authentication of a source of the product.

19. The method as recited in claim 1, comprising assessing a sequence of two or more transaction data payload elements for authentication of a pedigree of the product.

20. A computer program product comprising a computer readable storage medium having instructions stored thereon, which when executed by a computer, cause the computer to perform a method comprising:
   receiving, over a network, one or more sensor recorded data elements related to information selected from the group consisting of: product condition associated with a consumer product at a particular time and/or place, location associated with the product at the particular time and/or place, and current state associated with the product at the particular time and/or place, wherein the one or more data elements are selected from the group consisting of: product harvest temperature, harvest time, time until the product is cooled to low temperature, low temperature the product is cooled to, current product temperature, dwell time of product temperature at specific temperature ranges, estimated remaining shelf life at a specific point in time and/or at a specific process and/or transaction point, moisture content of product, Brix ratio of product or similar product from the same source at a point in time, color reading, photo spectroscopy reading, reflectivity reading, product weight, and product dimensions;

using the received data elements to create or update an entry for a payload of a transaction in a blockchain; and sending the entry for recording as a transaction in a specified blockchain ledger.

21. The computer program product as recited in claim 20, wherein at least one of the one or more data elements corresponds to completion of a one or more process steps in a production process of the product.

22. The computer program product as recited in claim 20, wherein at least one of the one or more data elements corresponds to a process parameter in a production process related to an effectiveness of a process step on the product.

23. A system, comprising:

a processor; and logic integrated with the processor, executable by the processor, or integrated with and executable by the processor, the logic being configured to:

receive, over a network, by the processor, one or more sensor recorded data elements related to information selected from the group consisting of: product condition associated with a consumer product at a particular time and/or place, location associated with the product at the particular time and/or place, and current state associated with the product at the particular time and/or place, wherein the one or more data elements are selected from the group consisting of: product harvest temperature, harvest time, time until the product is cooled to low temperature, low temperature the product is cooled to, current product temperature, dwell time of product temperature at specific temperature ranges, estimated remaining shelf life at a specific point in time and/or at a specific process and/or transaction point, moisture content of product, Brix ratio of product or similar product from the same source at a point in time, color reading, photo spectroscopy reading, reflectivity reading, product weight, and product dimensions;

use, by the processor, the received data elements to create or update an entry for a payload of a transaction in a blockchain; and send, by the processor, the entry for recording as a transaction in a specified blockchain ledger.

24. The method as recited in claim 1, comprising receiving a second condition associated with the product, the second condition being selected from the group consisting of: pathogens, presence of bacteria, presence of viruses, and presence of prions; and using the second condition to create or update an entry for a payload of a transaction in the blockchain.

25. The system as recited in claim 23, comprising logic configured to receive, by the processor, a second condition associated with the product, the second condition being selected from the group consisting of: pathogens, presence of bacteria, presence of viruses, and presence of prions; and using the second condition to create or update an entry for a payload of a transaction in the blockchain.

26. The method as recited in claim 1, comprising:

receiving processing information associated with the product, the processing information being selected from the group consisting of: mixed product matching results, provenance testing results, authentication testing results, and wash water test results; and using the processing information to create or update an entry for a payload of a transaction in the blockchain.

* * * * *